(12) United States Patent
Ahn

(10) Patent No.: US 9,377,895 B2
(45) Date of Patent: Jun. 28, 2016

(54) METHOD FOR DIVIDED SCANNING OF TOUCH PANEL

(71) Applicant: SiliconFile Technologies Inc., Seongnam-si, Gyeonggi-do (KR)

(72) Inventor: Jung Hong Ahn, Anyang-si (KR)

(73) Assignee: SiliconFile Technologies Inc., Gyeonggi-do (KR)

( * ) Notice: Subject to any disclaimer, the term of this patent is extended or adjusted under 35 U.S.C. 154(b) by 0 days.

(21) Appl. No.: 14/415,822

(22) PCT Filed: Jul. 4, 2013

(86) PCT No.: PCT/KR2013/005925
§ 371 (c)(1),
(2) Date: Jan. 20, 2015

(87) PCT Pub. No.: WO2014/014218
PCT Pub. Date: Jan. 23, 2014

(65) Prior Publication Data
US 2015/0199065 A1    Jul. 16, 2015

(30) Foreign Application Priority Data

Jul. 20, 2012  (KR) .................. 10-2012-0079211

(51) Int. Cl.
*G06F 3/041* (2006.01)
*G06F 3/045* (2006.01)
*G06F 3/042* (2006.01)
*G06F 1/32* (2006.01)

(52) U.S. Cl.
CPC ............ *G06F 3/0416* (2013.01); *G06F 1/3262* (2013.01); *Y02B 60/1242* (2013.01); *Y02B 60/32* (2013.01)

(58) Field of Classification Search
CPC ..... G06F 3/0416; G06F 1/3262; Y02B 60/32; Y02B 60/1242
USPC .................................................. 345/173–178
See application file for complete search history.

(56) References Cited

U.S. PATENT DOCUMENTS

2008/0062150 A1* 3/2008 Lee .................. G06F 3/0416
345/175
2012/0105357 A1* 5/2012 Li ..................... G06F 3/044
345/174

FOREIGN PATENT DOCUMENTS

| JP | 2010-39602 | 2/2010 |
| KR | 10-2005-0064375 | 6/2005 |
| KR | 10-2010-0001918 | 1/2010 |
| KR | 10-1105978 | 1/2012 |

OTHER PUBLICATIONS

International Search Report for International Application No. PCT/KR2013/005925, dated Aug. 29, 2013.

* cited by examiner

*Primary Examiner* — Amit Chatly
(74) *Attorney, Agent, or Firm* — IP & T Group LLP

(57) ABSTRACT

The present disclosure relates to a method for divided scanning of a touch panel, in which a touch panel scanning process is divided into a pre-scan process and a main scan process. According to the embodiment of the present invention, a touch panel scan process, which had been performed in existing touch panels, may be divided into a pre-scan process and a main scan process, and the performed in various manners. Thus, while power consumption is reduced, the speed of response to an external touch can be improved.

9 Claims, 12 Drawing Sheets

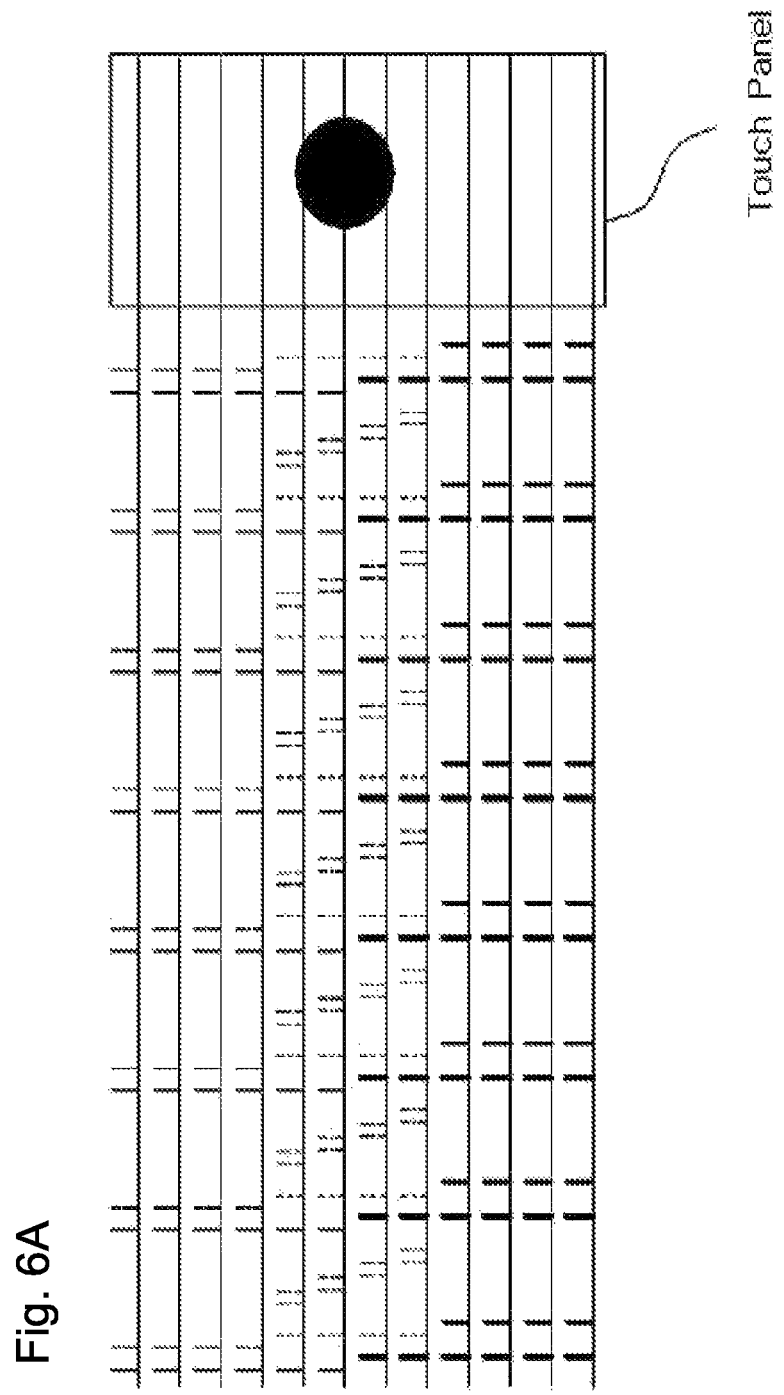

METHOD FOR DIVIDED SCANNING OF TOUCH PANEL

TECHNICAL FIELD

The present disclosure relates to a method for divided scanning of a touch panel, and more particularly, to a method for divided scanning of a touch panel, which divides a touch panel scan process into a pre-scan process and a main scan process, thereby reducing power consumption and increasing the speed of response to an external touch.

BACKGROUND ART

The application range of a touch function which has become a necessary function for most mobile devices has expanded to input devices of home appliances. A time of battery use, which is one of the most important specifications of a mobile product, is determined by the power consumptions of the respective parts of the mobile product. Thus, touch products mounted on mobile products must be designed as low-power consumption products.

Furthermore, with the enhancement in performance of mobile products, consumers using the mobile products have requested a very complex and delicate touch input function.

During a normal operation for calculating the coordinate of an external touch on a touch panel, existing products perform a scanning operation on the entire touch panel by performing a scanning operation for each line.

FIG. 1 is a diagram for describing a scanning method for a touch panel in conventional touch products.

As illustrated in FIG. 1, the touch panel 104 for the conventional touch products includes driving lines 101 serving as horizontal lines and input lines 102 serving as vertical lines.

In the method for scanning the touch panel for the conventional touch products, an operation of driving a driving voltage to one driving line and then reading values of all input lines is referred to as a single scan. Furthermore, a single scan for one line is performed several times according to a value set by a touch controller 105. Such a scan is referred to as a line scan. Furthermore, the line scan is sequentially or randomly performed on all driving lines. Such a scan is referred to as a frame scan 103.

In general, the touch controller drives the driving lines in order of the single scan, the line scan, and the frame scan. Then, the touch controller reads the state of the touch panel by reading the values of the input lines. The touch controller may perform the frame scan in a different order from the above-described order. However, in order to finally read the state of the panel, the touch controller repetitively drives nodes within the touch panel by a required number of times, and reads the values of the nodes.

The read values of the panel nodes are used for calculating a coordinate of an external touch object according to various arithmetical operations, a filter function, and a location tracking algorithm. Such internal arithmetic operation functions of the touch controller are designed to be performed during one frame.

Thus, the frame scan operation and the internal arithmetic operations may be designed to have a period within one frame, and performed at the same time. Such a method minimizes the operating time of one frame. The operating time of one frame in the operation of the touch panel determines the speed of touch response to an external touch. The touch response speed is an important factor for evaluating the performance of the touch panel.

One frame period which determines the touch response speed as an important factor for evaluating the performance of the touch panel is set according to the number of driving lines, the repeat count, and the calculation amount of the touch controller.

An interval between the driving lines is set according to the size of a touch object of which a touch can be sensed, and the number of driving lines is set by dividing the size of the entire panel by the interval between the driving lines. Thus, the number of driving lines cannot be reduced in order to simply increase the touch response speed.

The repeat count for each line is set according to the relation with noise generated in the panel. When the repeat count for the line scan is reduced, the touch response speed is increased, but noise is also increased. Thus, it is difficult to reduce the repeat count for the line scan, in order to increase the touch response speed.

Since the internal calculation amount of the touch controller is set according to the number of the driving lines, the repeat count, and the number of the input lines, it is also difficult to reduce the internal calculation amount, because of the above-described reasons.

Therefore, since the touch response speed cannot be improved through the conventional scanning method, this situation may cause a problem in which a touch operation responds slower than an actual operation. Furthermore, since the internal calculation amount for the panel scan and the touch coordinate calculation is not reduced, power consumption cannot be reduced.

DISCLOSURE

Technical Problem

Various embodiments are directed to a method for divided scanning of a touch panel, which divides a touch panel scan process into a pre-scan process and a main scan process, senses whether a touch occurred and a region where the touch occurred during the pre-scan process, performs a scan operation only on the region where the touch occurred, and removes an unnecessary scan operation in the other regions where no touch occurs, thereby reducing power consumption.

Technical Solution

In an embodiment, there is provided a method for scanning a touch panel, which scans a touch panel in order to recognize a position of a touch on the touch panel when the touch panel is touched by an external object. The process of scanning the touch panel may be divided into: a pre-scan process of dividing the touch panel into a plurality of blocks and sensing in which of the blocks the touch occurred; and a main scan process of calculating an exact coordinate of the touch in the block where the occurrence of the touch was sensed, according the result of the pre-scan process.

Advantageous Effects

According to the embodiment of the present invention, a touch panel scan process, which had been performed in existing touch panels, may be divided into a pre-scan process and a main scan process, and the performed in various manners. Thus, while power consumption is reduced, the speed of response to an external touch can be improved.

BRIEF DESCRIPTION OF DRAWINGS

FIGS. 6A and 6B are diagrams illustrating another example of timing in the high-speed response operation mode in the method for divided scanning of a touch panel according to the embodiment of the present invention.

MODE FOR INVENTION

Hereafter, exemplary embodiments of the present invention will be described in detail with reference to the accompanying drawings.

A scanning method according to an embodiment of the present invention divides a scan process for an entire touch panel, which had been performed in an existing touch panel, into a pre-scan process and a main scan process, thereby reducing power consumption and increasing the speed of response to an external touch.

The pre-scan process is performed to check whether a touch occurred in each of several blocks obtained by dividing the touch panel. According to the result of the pre-scan process, the main scan process is performed only on a block in which a touch exists, instead of a scan process for the entire panel, thereby calculating the exact coordinates where the touch occurred.

Thus, since a scanning operation is not performed on the other blocks where no touch occurs, an unnecessary panel measurement and an internal calculation amount can be reduced. As described above, when the pre-scan process for searching for a block in which a touch occurs within the panel is added prior to the main scan process, it is possible to reduce unnecessary operations for the other blocks in which no touch occurs, thereby reducing power consumption and improving touch response speed.

The scanning method according to the embodiment of the present invention may perform two scan processes, that is, the pre-scan process and the main scan process, such that a controller reads the state of the touch panel.

During the pre-scan process, the touch panel is divided into a plurality of blocks, driving lines within the divided blocks are driven at the same time, and the values of touch panel nodes are checked through input lines within the blocks, in order to determine in which of the blocks a touch exists.

During the main scan process, driving lines, required for calculating the exact coordinates of a point at which the touch occurred in the block where the touch exists according to the result of the pre-scan process, are driven to read values.

Figure 1:
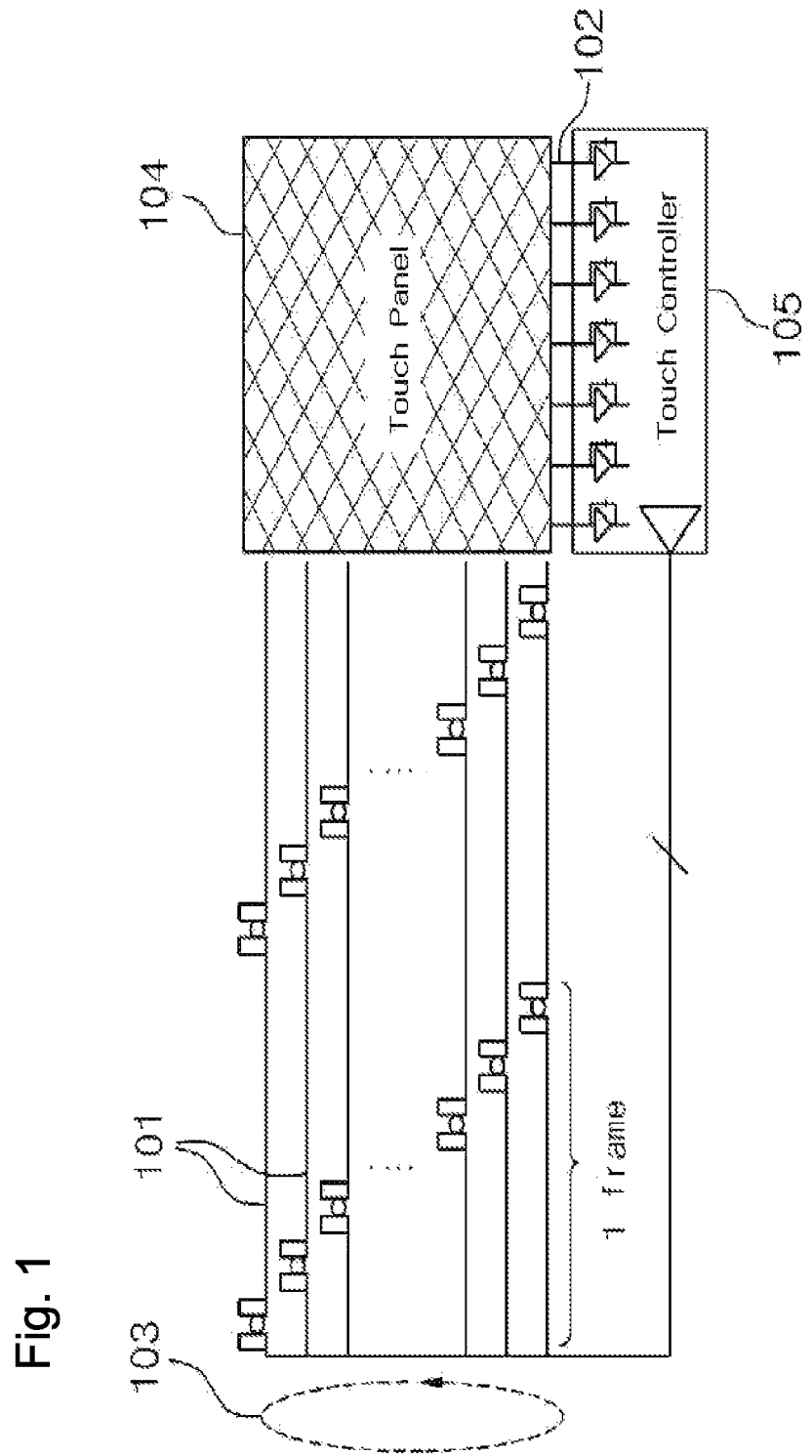
FIG. 1 is a diagram for describing a scanning method for a touch panel in conventional touch products.
Figure 2:
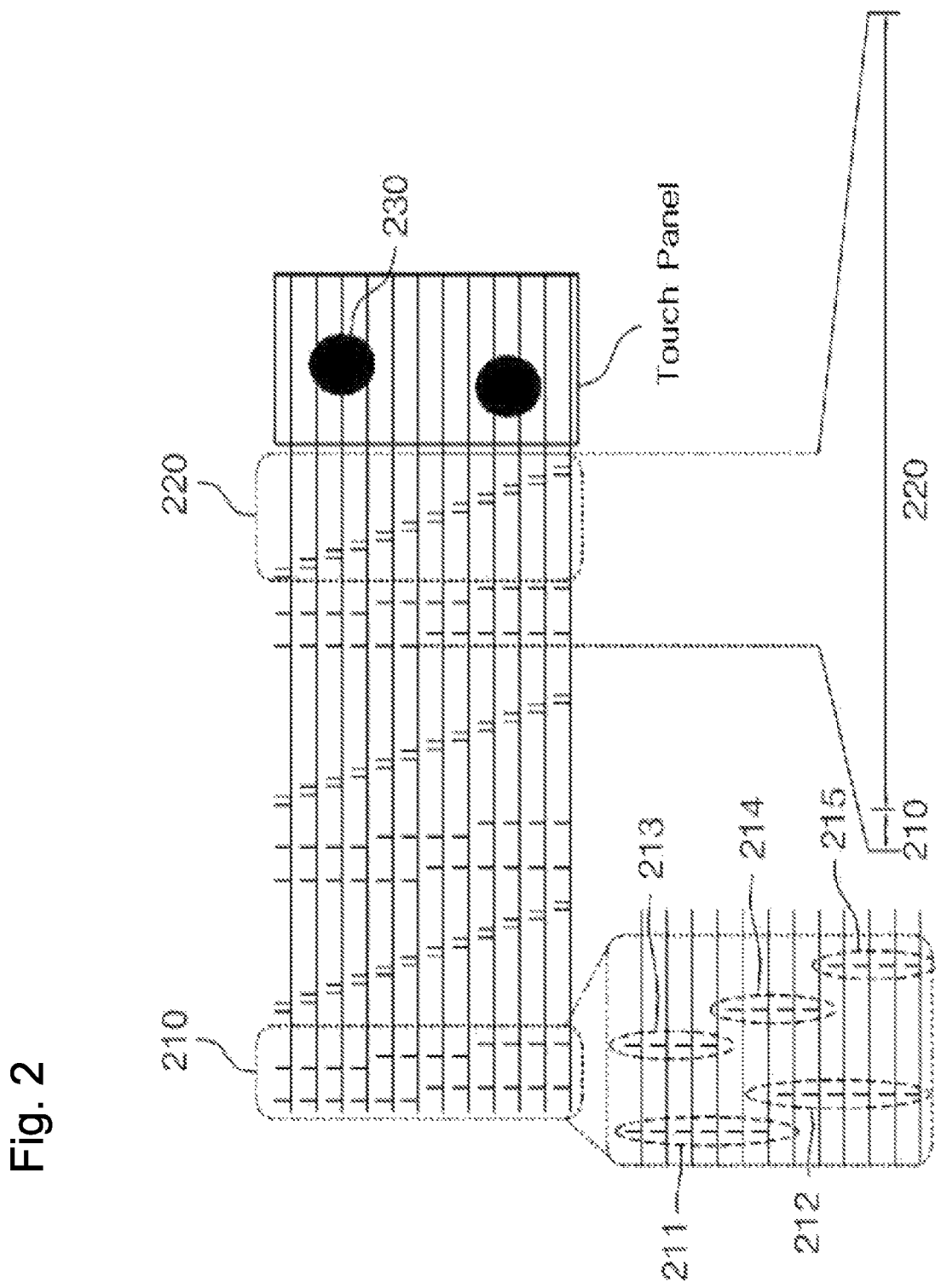
FIG. 2 is a diagram for describing a method for divided scanning of a touch panel according to an embodiment of the present invention.

FIG. 2 is a diagram for describing a method for divided scanning of a touch panel according to an embodiment of the present invention.

In FIG. 2 and the following drawings, the entire touch panel is bisected into first and second blocks 211 and 212, and the entire touch panel is trisected into third to fifth blocks 213 to 215. That is, the pre-scan process of checking whether an external touch 230 exists is performed five times. However, the touch panel may be further subdivided to increase or decrease the number of pre-scan processes.

During the pre-scan process, driving lines of the touch panel divided into the plurality of blocks are driven at the same time, and the values of touch panel nodes induced in the driving lines are read through input lines. Then, the values are calculated to determine whether a touch exists.

Referring to FIG. 2, five pre-scan processes are performed. Specifically, the touch panel is divided into the first and second blocks 211 and 212 so as to perform a pre-scan process. Then, the touch panel is divided into the third to fifth blocks 213 to 215 so as to perform a pre-scan process. That is, through the five pre-scan processes, the controller determines in which block a touch exists. According to the determination result, the controller determines whether to perform a main scan process.

FIG. 2 illustrates the ratio of a pre-scan process period 210 and a main scan process period 220 during one frame. The pre-scan process period corresponding to 2% of one frame is performed for a very little time.

Figure 3:
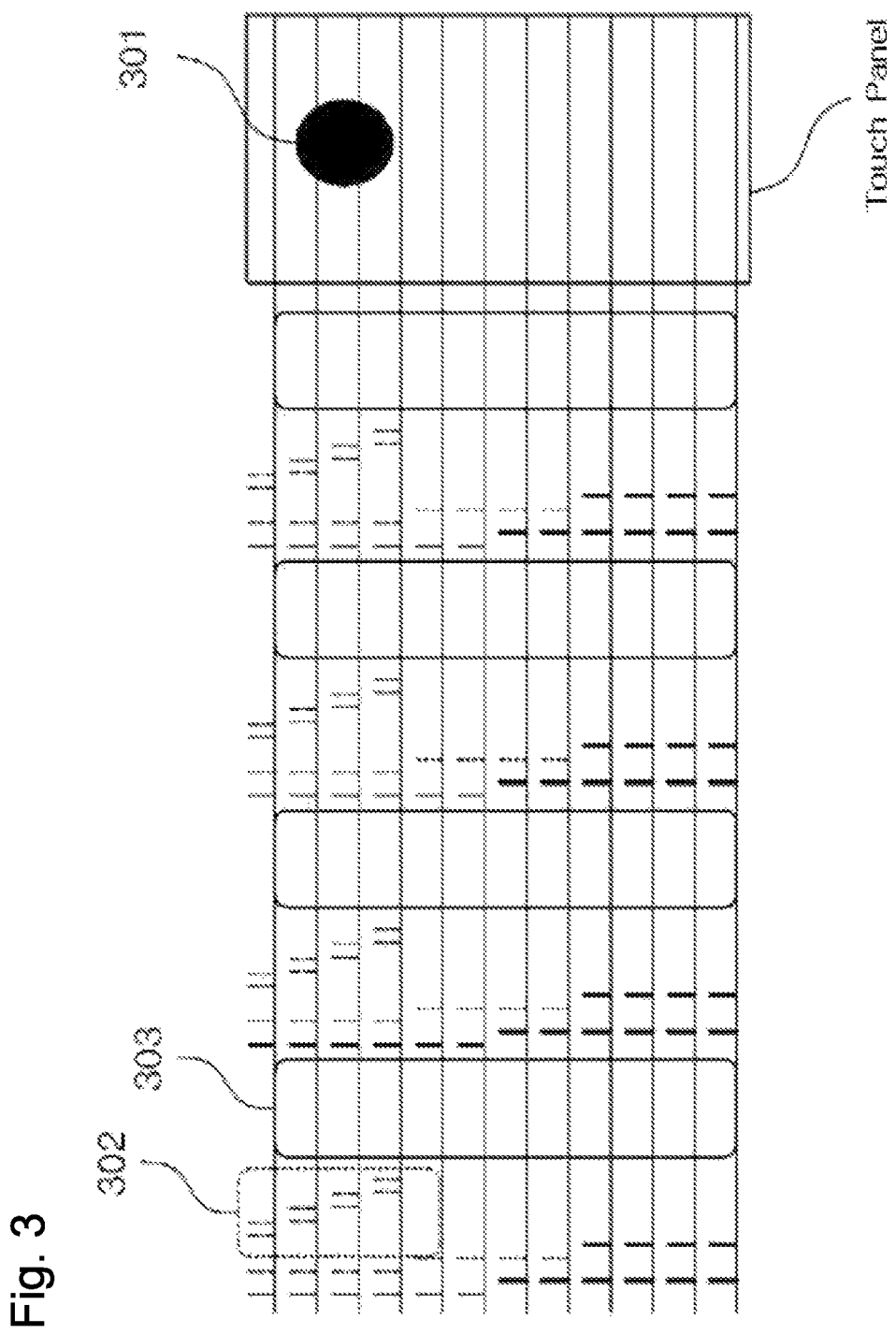
FIG. 3 is a diagram illustrating an example of timing in a low-power operation mode in the method for divided scanning of a touch panel according to the embodiment of the present invention.

FIG. 3 is a diagram illustrating an example of timing in a low-power operation mode in the method for divided scanning of a touch panel according to the embodiment of the present invention.

FIG. 3 illustrates a main scan process which is performed when a touch is sensed during the pre-scan processes for the first block 211 and the third block 213, among the pre-scan processes for the five blocks, which have been performed in FIG. 2.

When a touch is sensed only in the first block 211 and the third block 213 and no touch is sensed in the second block 212, the fourth block 214, and the fifth block 215, the controller determines that a touch 301 occurred in the upper ⅓ of the touch panel. Thus, during the main scan process after the pre-scan process, only the upper ⅓ of the touch panel corresponds to a scan region 302, and the values of touch panel nodes in the scan region 302 are read. On the other hand, the lower ⅔ of the touch panel corresponds to a non-scan region 303, and a scanning operation is not performed.

Thus, the analog input stage of the touch controller, which reads the values of the touch panel, may not be operated for the lower ⅔ of the touch panel, but turned off. Therefore, the power consumption of the input stage can be reduced by 66%. Furthermore, since the touch controller does not need to perform an internal arithmetic operation on the non-scan region 303, power consumption used for the internal arithmetic operation can also be reduced.

In the embodiment of the present invention, as an unnecessary scanning operation is omitted for the panel region where no touch occurs, the power consumption of the touch controller can be reduced. Such a mode is defined as "low-power operation mode".

Figure 4A:
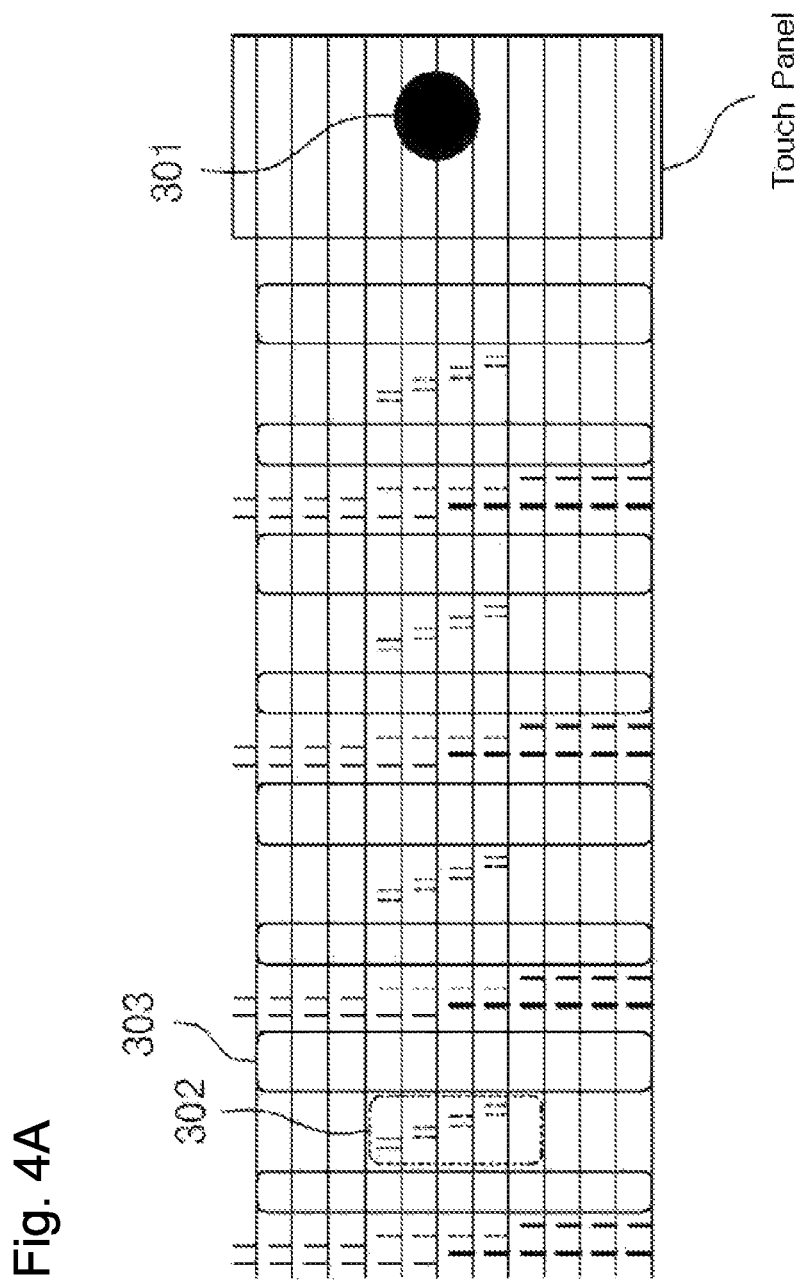
FIGS. 4A and 4B are diagrams illustrating another example of timing in the low-power operation mode in the method for divided scanning of a touch panel according to the embodiment of the present invention.
Figure 4B:
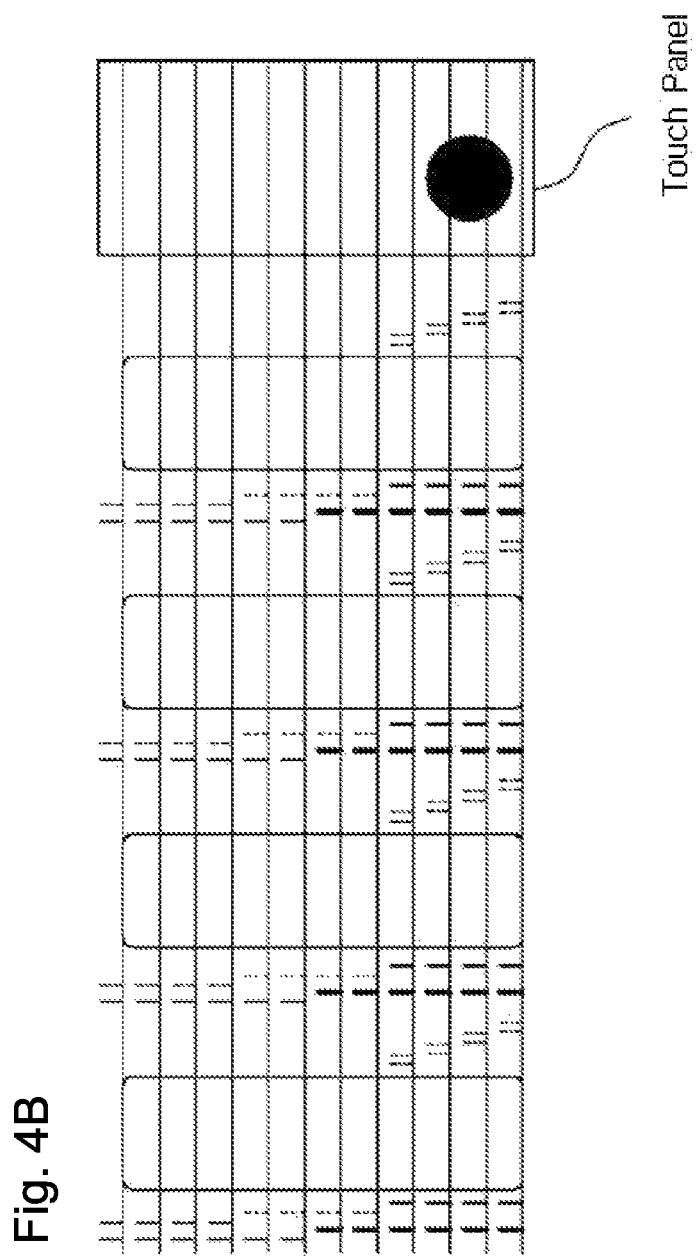

FIGS. 4A and 4B are diagrams illustrating another example of timing in the low-power operation mode in the method for divided scanning of a touch panel according to the embodiment of the present invention.

FIGS. 4A and 4B illustrate how a main scan process is performed according to a result of a pre-scan process, as the "low-power operation mode".

FIG. 4A illustrates a main scan process in case where a touch is sensed in the first block 211, the second block 212, and the fourth block 214, among the pre-scan processes for the five blocks. FIG. 4B illustrates a main scan process in case where a touch is sensed in the second block 212 and the fifth block 215, among the pre-scan processes for the five blocks.

As illustrated in FIG. 4A, when a touch is sensed in the first block 211, the second block 212, and the fourth block 214 and no touch is sensed in the third block 213 and the fifth block 215, the controller determines that the touch occurred in the central ⅓ of the touch panel. As illustrated in FIG. 4B, when a touch is sensed in the second block 212 and the fifth block 215 and no touch is sensed in the first block 211, the third block 213, and the fourth block 214, the controller determines that the touch occurred in the lower ⅓ of the touch panel.

As such, the result of the pre-scan process may be changed depending on a block in which a touch is sensed, and the main scan process may be performed differently according to the result of the pre-scan process. The "low-power operation mode" illustrated in FIGS. 3 and 4 can reduce power consumption by 50 to 66%.

Figure 5:
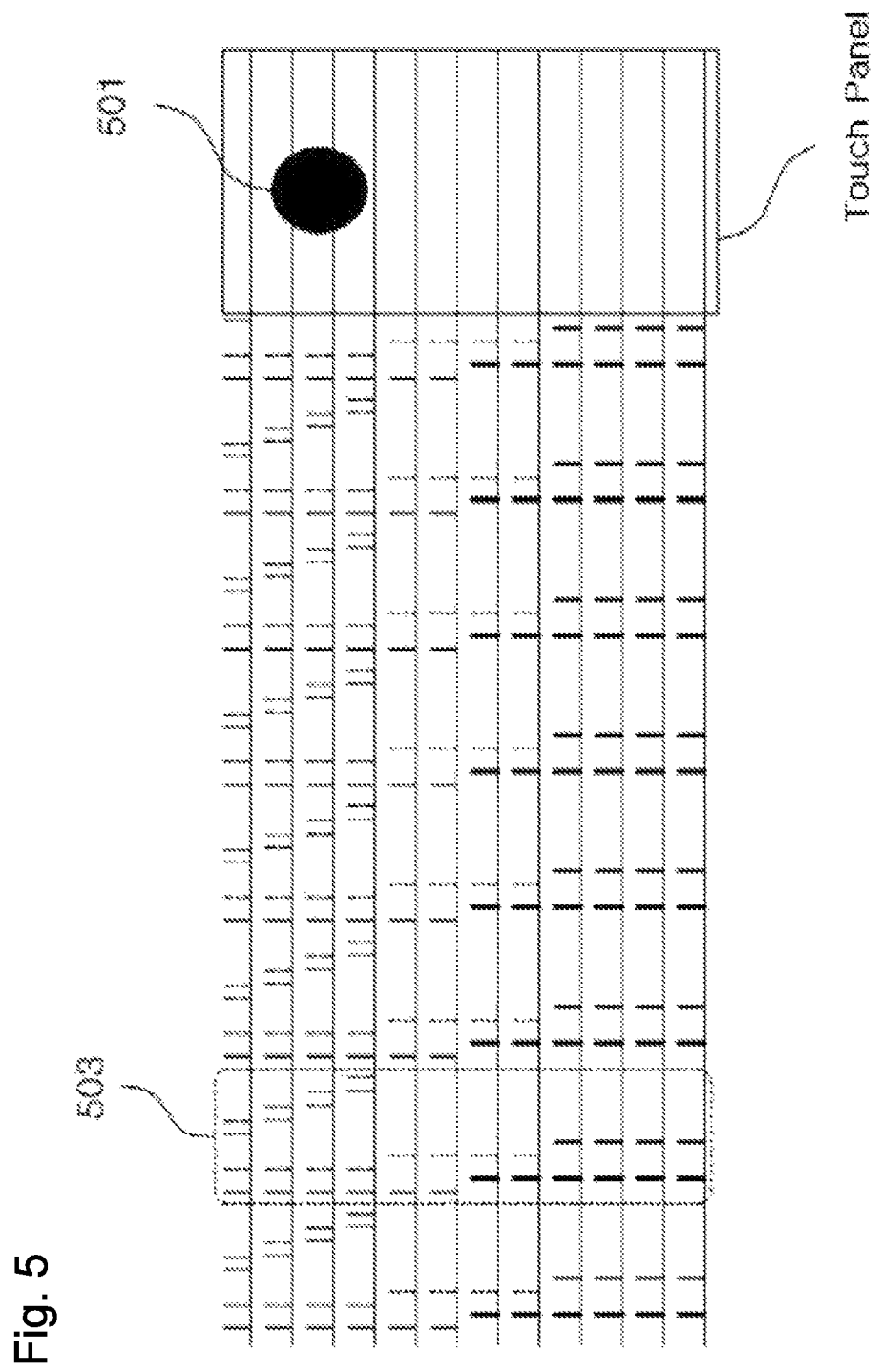
FIG. 5 is a diagram illustrating an example of timing in a high-speed response operation mode in the method for divided scanning of a touch panel according to the embodiment of the present invention.

FIG. 5 is a diagram illustrating an example of timing in a high-speed response operation mode in the method for divided scanning of a touch panel according to the embodiment of the present invention.

FIG. 5 illustrates a main scan process in case where a touch is sensed during pre-scan processes for the first block 211 and the third block 213 as illustrated in FIG. 3. Referring to FIG. 5, the controller scans the upper ⅓ of the touch panel, and then enters a pre-scan process in order to immediately start an operation of a new frame without a non-scan region, unlike the case of FIG. 3.

When the operation of the new frame is started after the main scan process for the upper ⅓ of the touch panel as illustrated in FIG. 5, the scan time of one frame can be reduced.

When the period of one frame is reduced by ⅓ (503), a touch response time during which a touch of an external object is sensed and reported to a host can be reduced by ⅓, and the maximum touch sensing speed at which a quick motion of the external object touching the touch panel can be sensed becomes three times faster.

In the present embodiment, as unnecessary scanning operations are removed to reduce the time of one frame, the touch response speed and the maximum touch sensing speed can be improved. This mode is defined as "high-speed response operation mode".

Figure 6B:
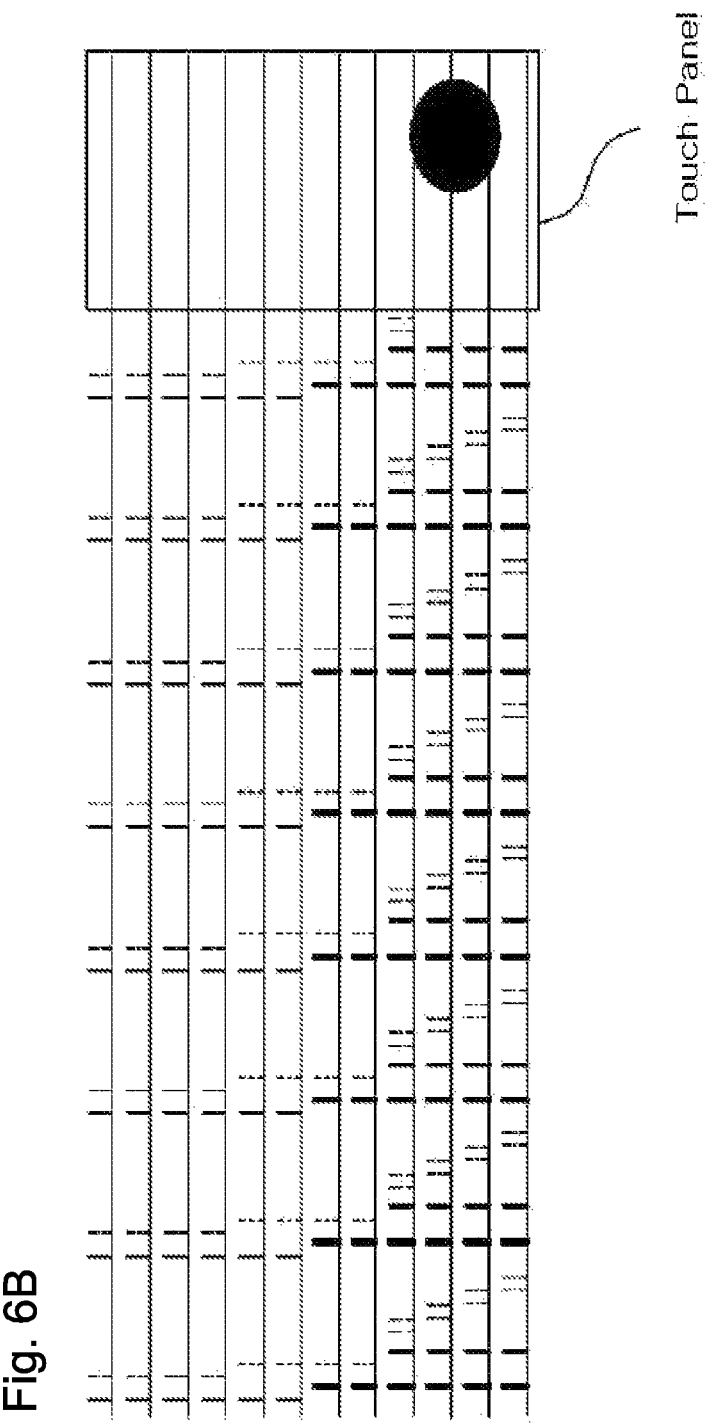

FIGS. 6A and 6B are diagrams illustrating another example of timing in the high-speed response operation mode in the method for divided scanning of a touch panel according to the embodiment of the present invention.

FIGS. 6A and 6B illustrate how a main scan process is performed according to a result of a pre-scan process, as the "high-speed response operation mode".

FIG. 6A illustrates a main scan process in case where a touch is sensed in the first block 211, the second block 212, and the fourth block 214, among the pre-scan processes for the five blocks. FIG. 6B illustrates a main scan process in case where a touch is sensed in the second block 212 and the fifth block 215, among the pre-scan processes for the five blocks.

As illustrated in FIG. 6A, when a touch is sensed in the first block 211, the second block 212, and the fourth block 214 and no touch is sensed in the third block 213 and the fifth block 215, the controller determines that the touch occurred in the central ⅓ of the touch panel. As illustrated in FIG. 6B, when a touch is sensed in the second block 212 and the fifth block 215 and no touch is sensed in the other blocks, the controller determines that the touch occurred in the lower ⅓ of the touch panel.

As such, the result of the pre-scan process may be changed depending on a block in which a touch is sensed, and the main scan process may be performed differently according to the result of the pre-scan process. In the "high-speed response operation mode" as illustrated in FIGS. 5 and 6, the maximum touch sensing speed can be increased two or three times.

Figure 7:
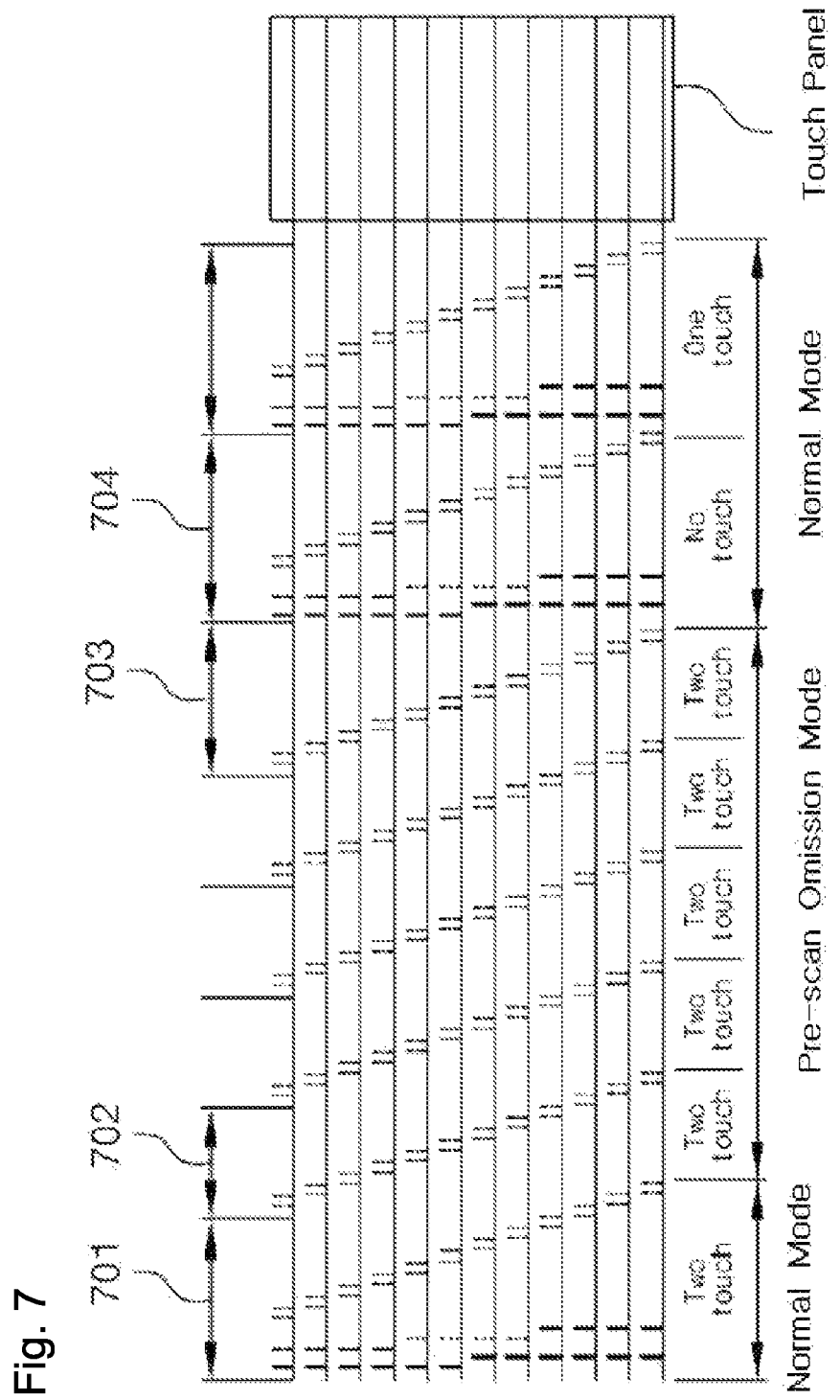
FIG. 7 is a diagram for describing a pre-scan omission mode in the method for divided scan of a touch panel according to the embodiment of the present invention.

FIG. 7 is a diagram for describing a pre-scan omission mode in the method for divided scan of a touch panel according to the embodiment of the present invention.

According to the scanning method illustrated in FIGS. 2 to 6, the main scan process needs to be performed at each frame depending on whether a touch occurred, after the pre-scan process. As such, when the pre-scan process for the main scan process of the entire panel is applied for each frame, the scanning method is performed as if a pre-scan process was added to a scan process in the conventional scanning method. Thus, a time required for an unnecessary pre-scan process may be added at each frame. Then, the touch response speed may become slower than in the conventional scanning method.

Since the time required for the pre-scan process is much smaller than the entire scan operation time, the influence of the time on the touch response speed may be considered to be negligible. After all, however, the touch response speed may be reduced in comparison to the conventional scanning method.

Thus, in the present embodiment, the pre-scan omission mode may be added to minimize the reduction of the touch response speed.

The pre-scan omission mode may be performed as follows. When a result of a pre-scan process at an (n−1)-th frame 701 indicates that the entire touch panel is to be scanned, a pre-scan process may be omitted from an n-th frame 702. Then, a pre-scan process may be continuously omitted until a frame 703 of which the final touch result indicates "no touch" or "one touch". From a frame 704 which first emerges after the final touch result indicates "no touch" or "one touch", a pre-processing process is performed again.

As such, when the entire touch panel needs to be scanned, the pre-scan omission mode may be executed to perform the pre-scan process only for the first frame at which the scan process for the entire panel is started. Then, a pre-scan process may be omitted at the following frames.

As a result, it is possible to minimize the reduction of the touch response speed, compared to the conventional scan method in which an unnecessary pre-scan process is continuously performed.

Figure 8:
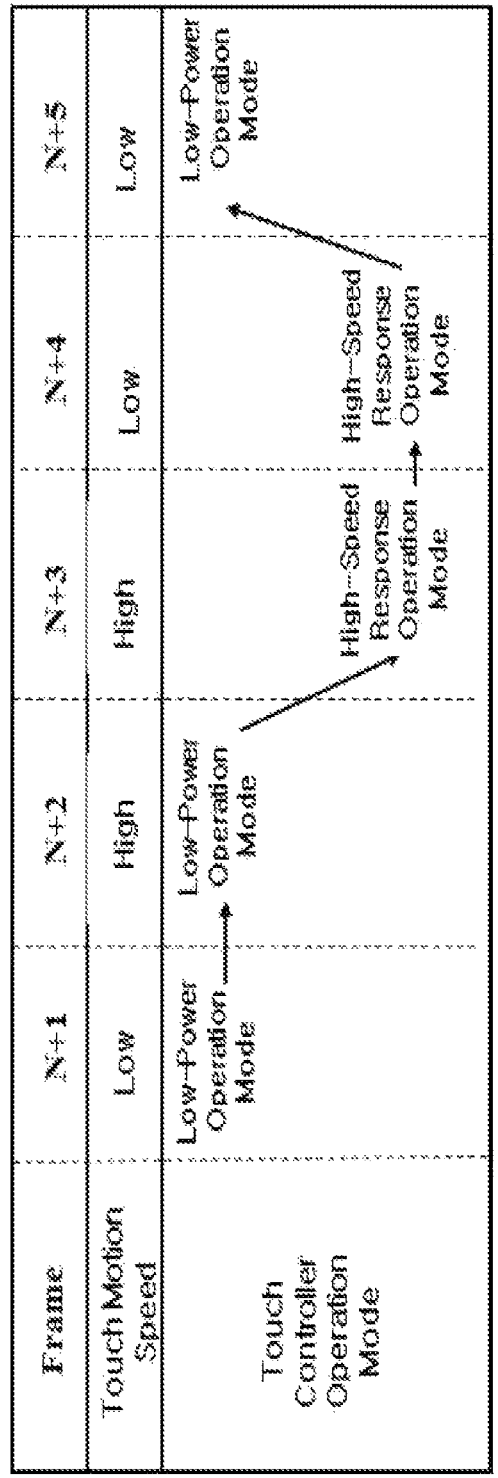
FIG. 8 is a diagram for describing a mode switching process in the method for divided scanning of a touch panel according to the embodiment of the present invention.

FIG. 8 is a diagram for describing a mode switching process in the method for divided scanning of a touch panel according to the embodiment of the present invention.

Referring to FIG. 8, the low-power operation mode and the high-speed response operation mode are automatically switched according to the speed of an external touch object in the method for divided scanning of a touch panel according to the embodiment of the present invention.

The controller may calculate the motion speed of an external touch object by compare a previous touch coordinate to a current touch coordinate. When the calculated motion speed of the external touch object is high, the high-speed response operation mode may be executed, and when the calculated motion speed is low, the low-power operation mode may be executed. The operation mode of the current frame is determined according to a value obtained by evaluating the motion speed of the external touch object, which is calculated at the previous frame.

In FIG. 8, an (N+1)-th frame is performed in the low-power operation mode, and the touch motion speed is low. Then, since the operation mode of an (N+2)-th frame is determined according to the touch motion speed of the (N+1)-th frame, the operation mode of the (N+2)-th frame is maintained in the low-power operation mode. On the other hand, when the touch motion speed of the (N+2)-th frame is evaluated to be high, the operation mode of an (N+3)-th frame is switched to the high-speed operation mode.

According to the scanning method as illustrated in FIG. 8, the touch controller may switch the operation mode according to the motion speed of the external touch object. Thus, the power consumption can be minimized, and the maximum touch response speed can be improved.

In general, when a user touches a touch panel, the touch is performed as one touch for a short time.

In the conventional scanning method, when a touch for a short time and no touch for a short time are repeated, a normal mode for continuously scanning the entire panel is executed at all times. Then, when no touch occurs for a predetermined time, a sleep mode is executed to reduce power consumption. Then, in order to awake from the sleep mode, a pre-scanning operation for determining whether a touch occurs is performed once at each long period.

At this time, when a touch occurs, the sleep mode is switched to the normal mode, and the normal mode for scanning the entire panel is executed at each frame. That is, in the conventional scanning method, a scan operation similar to the pre-scan operation according to the embodiment of the present invention is used to switch the sleep mode to the normal mode.

In the embodiment of the present invention, however, a "normal-operation power saving mode" may be executed at a no-touch period in which no touch occurs for a short time, in order to minimize power consumption.

Figure 9:
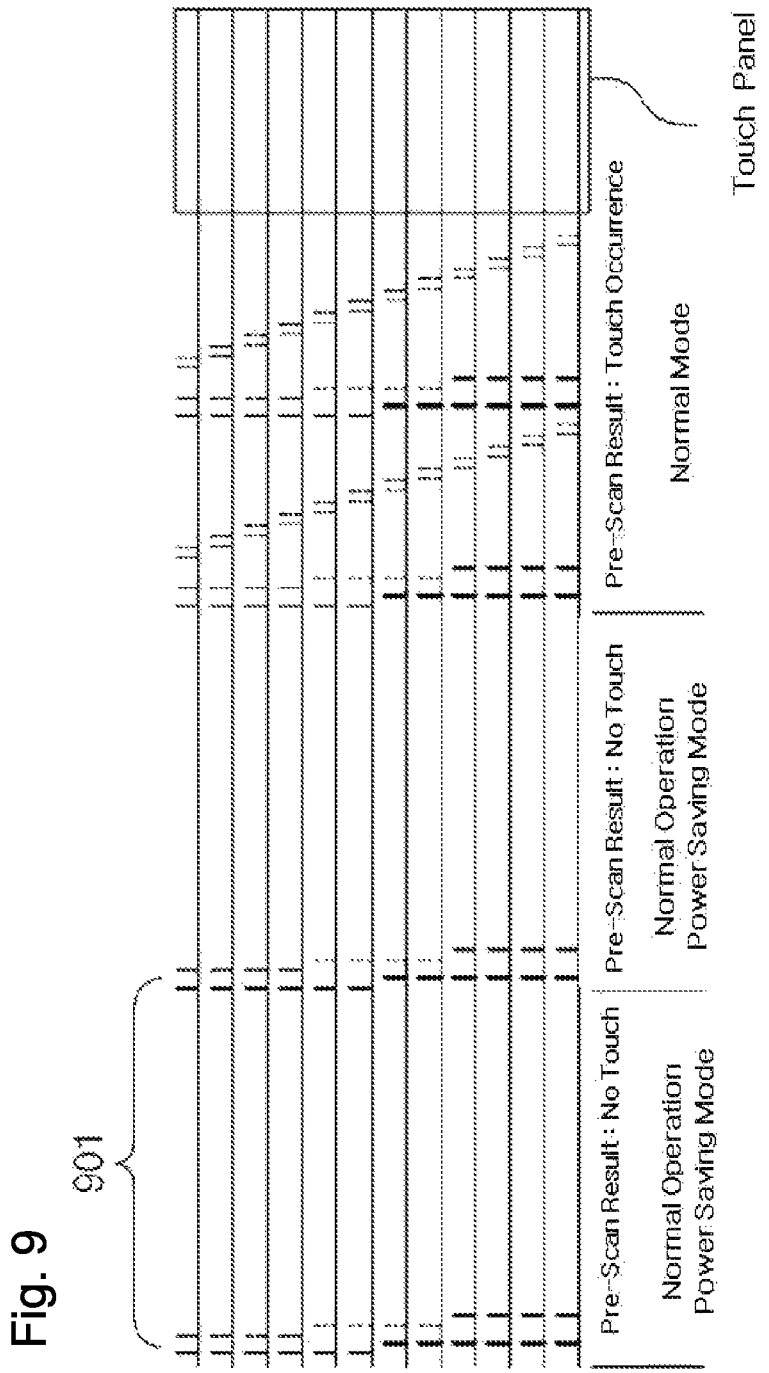
FIG. 9 is a diagram for describing a normal-operation power saving mode in the method for divided scanning of a touch panel according to the embodiment of the present invention.

FIG. 9 is a diagram for describing the normal-operation power saving mode in the method for divided scanning of a touch panel according to the embodiment of the present invention.

FIG. 9 illustrates a method capable of minimizing power consumption by defining a normal operation power saving mode in which a main scan process is omitted according to a result of a pre-scan process in a normal operation mode.

First, during a pre-scan period, whether a touch exists in each block is determined. When a touch exists, a main scan process defined for each of various cases is performed according to the occurrence position of the touch checked in the pre-scan period.

However, when it is determined that no touch occurs as the result of the pre-scan process, a main scan process may be omitted. Such a mode may be defined as a normal-operation power saving mode.

When the normal-operation power saving mode is started after the pre-scan operation at the current frame, a new frame is started at a predetermined time 901 after the pre-scan operation, and a pre-scan operation is performed again.

When a touch is not continuously inputted, the controller continuously operates the display panel in the normal-operation power saving mode. When a touch occurs as the result of the pre-scan process, the controller immediately performs a main scan process.

In general mobile products, most touches occur for a short time and then disappear. Thus, when the normal-operation power saving mode is applied, power consumption can be significantly reduced.

Figure 10:
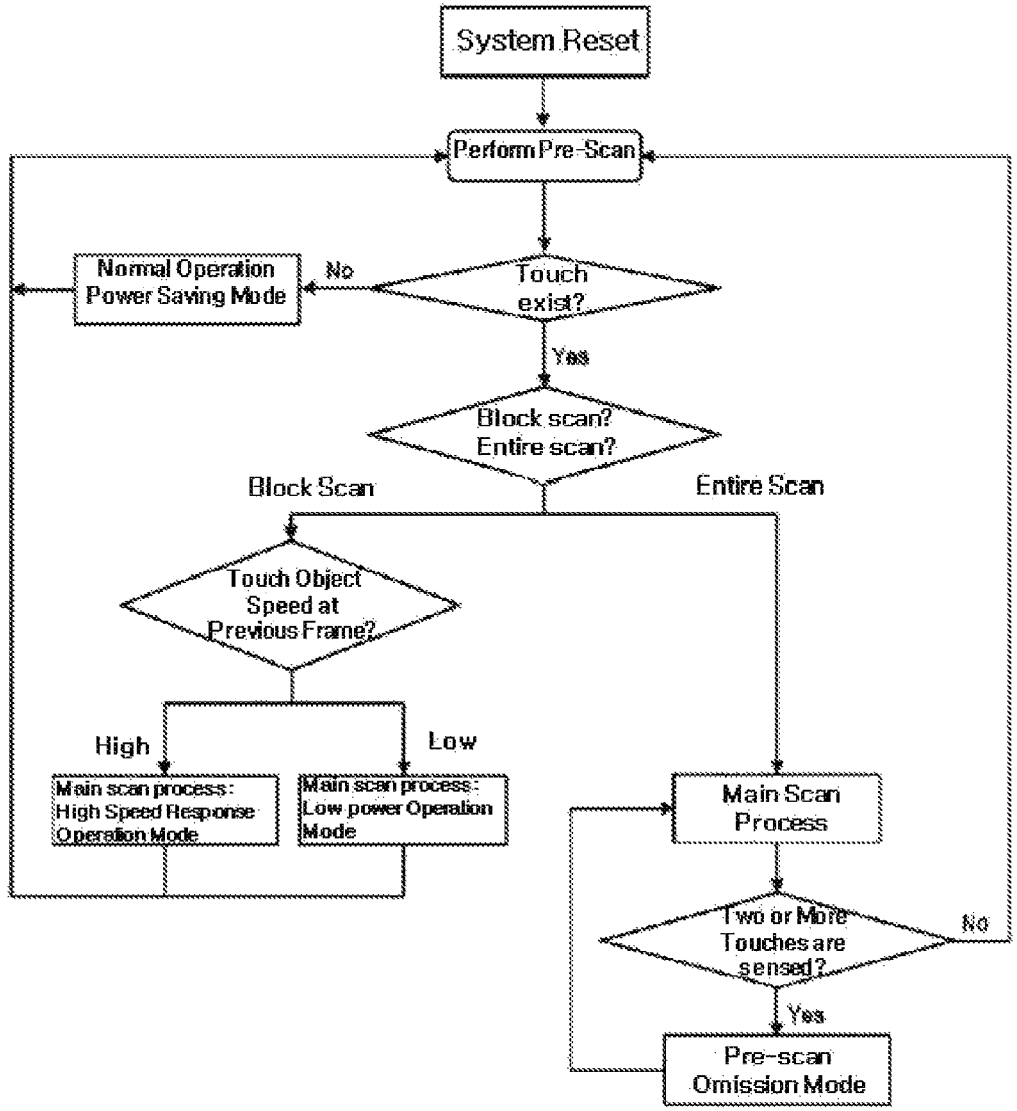
FIG. 10 is a flowchart illustrating the method for divided scanning of a touch panel according to the embodiment of the present invention.

FIG. 10 is a flowchart illustrating the method for divided scanning of a touch panel according to the embodiment of the present invention.

FIG. 10 illustrates a control method for performing various scan processes depending on how an external object touches the touch panel, in order to reduce power consumption and to improve response speed. Through a new scan process as illustrated in FIG. 10, it is possible to implement a high-performance and low-power touch panel.

First, when no touch exists as a result obtained by performing a pre-scan process, the controller performs the normal-operation power saving mode. On the other hand, when a touch exists, the controller selects whether to perform an entire scan process or a block scan process in which the touch panel is divided into a plurality of blocks.

When the block scan process is performed, the controller determines the touch motion speed of the external object at the previous frame. When the touch motion speed is low, a main scan process is performed in the low-power operation mode, and when the touch motion speed is high, a main scan process is performed in the high-speed response operation mode.

When the entire scan process is selected instead of the block scan process, the controller performs a main scan process. When two or more touches are sensed during the main scan process, the controller executes the pre-scan omission mode.

According to the embodiment of the present invention, a touch panel scan process which has been uniformly performed in existing touch panels may be divided into a pre-scan process and a main scan process, and performed in various manners.

As the touch panel scanning operation is automatically determined according to a variety of external touches on the touch panel, it is possible to minimize the power consumption of the controller which scans the display panel and calculates the values of the respective nodes of the touch panel. Furthermore, it is possible to increase the touch response speed and the maximum touch sensing speed.

Since the reduction of the power consumption and the improvement of the operation speed are in a trade-off relation, the reduction of the power consumption and the improvement of the operation speed cannot be achieved at the same time. However, according to the method for divided scanning of a touch panel, the motion speed of the external touch may be determined to automatically select a corresponding mode, and the operation performance such as low power consumption or high response speed can be effectively achieved.

While various embodiments have been described above, it will be understood to those skilled in the art that the embodiments described are by way of example only. Accordingly, the disclosure described herein should not be limited based on the described embodiments.

The invention claimed is:

1. A method for scanning a touch panel, which scans the touch panel in order to recognize a position of a touch on the touch panel when the touch panel is touched by an external object, wherein a process of scanning the touch panel is divided into: a pre-scan process of dividing the touch panel into a plurality of blocks and sensing in which of the blocks the touch occurred; and a main scan process of calculating an exact coordinate of the touch in the block where the occurrence of the touch was sensed, according the result of the pre-scan process, a touch coordinate calculated through the main scan process at a previous frame and a touch coordinate calculated through the main scan process at a current frame are used to calculate a motion speed of the external object, and a low-power operation mode and a high-speed response operation mode are automatically switched to each other according to the calculated motion speed of the external object, wherein in the low-power operation mode, driving lines are driven and values of respective nodes are read through input lines in the block where the touch occurred, and the other blocks in which no touch occurs are set to non-scan regions where the driving lines are not driven during a driving time of the touch panel and the values of the respective nodes are not read through the input lines, and in the high-speed response operation mode, the driving lines are driven and the values of the respective nodes are read through the input lines in the block where the touch occurred, but the driving time of the touch panel is omitted and the operation of the next frame is performed in the other blocks where no touch occurs.

2. The method of claim 1, wherein the main scan process comprises driving the driving lines in the block where the touch occurred, reading the values of the respective nodes in the touch panel through the input lines, and calculating the coordinate and motion of the touch using the read values.

3. The method of claim 2, wherein the main scan process is performed in the low-power operation mode, wherein in the low-power operation mode, the driving lines are driven and the values of the respective nodes are read through the input lines in the block where the touch occurred, and the other blocks where no touch occurs are set to non-scan regions in which the driving lines are not driven for the driving time of the touch panel, and the values of the respective nodes are not read through the input lines.

4. The method of claim 2, wherein the main scan process is performed in the high-speed response operation mode, wherein in the high-speed response operation mode, the driving lines are driven and the values of the respective nodes are read through the input lines in the block where the touch occurred, but the driving time of the touch panel is omitted and the operation of the next frame is performed in the other blocks where no touch occurs.

5. The method of claim 1, wherein when the main scan process is to be performed on the entire region of the touch panel according to the result of the pre-scan process, the touch panel is operated in a pre-scan omission mode in which the pre-scan process is selectively omitted at the following frames.

6. The method of claim 5, wherein when two or more touches are sensed as a result obtained by performing the main scan process on the entire region of the touch panel according to the result of the pre-scan process, the pre-scan process is omitted and the main scan process is performed on the entire region of the touch panel, in case where a scan process for the next frame is started.

7. The method of claim 5, wherein when no touch or one touch is sensed as a result obtained by performing the main scan process on the entire region of the touch panel according to the result of the pre-scan process, the pre-scan process is performed in case where a scan process for the next frame is started.

8. The method of claim 1, wherein when it is sensed that no touch occurs in the entire region of the touch panel as the result of the pre-scan process, the touch panel is performed in a normal-operation power saving mode in which the main scan process is omitted and a pre-scan process for the next frame is performed after a time specified by a user elapses.

9. The method of claim 1, wherein when it is sensed that no touch occurs in the entire region of the touch panel as the result of the pre-scan process, a normal-operation power saving mode in which the main scan process is omitted and a pre-scan process for the next frame is performed after a time specified by a user elapses and a normal mode in which the main scan process is performed regardless of the result of the pre-scan process is selectively applied.

\* \* \* \* \*